United States Patent [19]
Caldwell

[11] 4,185,193
[45] Jan. 22, 1980

[54] METHOD FOR ASSAYING FOR NEUTRON-FISSION-PRODUCING ORES

[75] Inventor: Richard L. Caldwell, Dallas, Tex.

[73] Assignee: Mobil Oil Corporation, New York, N.Y.

[21] Appl. No.: 906,907

[22] Filed: May 18, 1978

Related U.S. Application Data

[63] Continuation-in-part of Ser. No. 801,693, May 31, 1977, abandoned.

[51] Int. Cl.² .............................................. G01V 5/00
[52] U.S. Cl. .................................................. 250/269
[58] Field of Search ............................... 250/252, 269

[56] References Cited

U.S. PATENT DOCUMENTS

| | | | |
|---|---|---|---|
| 3,686,503 | 8/1972 | Givens et al. | 250/269 |
| 3,688,117 | 8/1972 | Givens | 250/269 |
| 3,710,112 | 1/1973 | Caldwell et al. | 250/269 |

*Primary Examiner*—Davis L. Willis
*Attorney, Agent, or Firm*—C. A. Huggett; William D. Jackson; William J. Scherback

[57] ABSTRACT

A system for assaying for neutron-fission-producing ore in the formations traversed by a borehole includes a pulsed neutron source and a neutron detector. The source is operated to irradiate such ore-bearing formations with fast neutrons, and the detector responds to the delayed fission neutrons emitted by the ore as a measure of ore concentration. The source is also operated to irradiate nonneutron-fission-producing ore-bearing formations with fast neutrons, and the detector responds to the delayed neutrons from oxygen-17 as a measure of the neutron output of the source. The measurement of ore concentration is corrected in accordance with the measured changes in the neutron output of the source.

4 Claims, 1 Drawing Figure

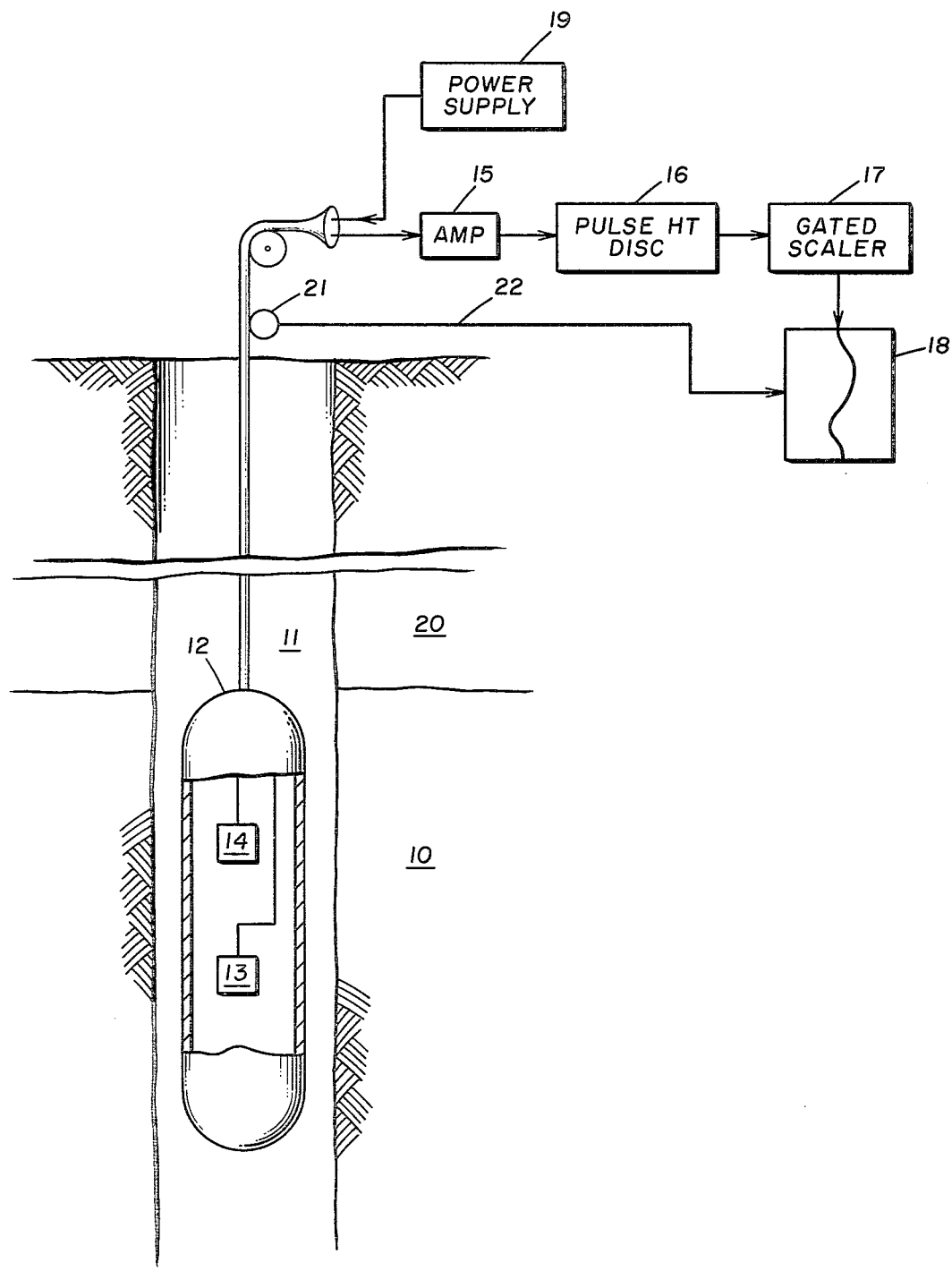

METHOD FOR ASSAYING FOR NEUTRON-FISSION-PRODUCING ORES

CROSS REFERENCE TO RELATED APPLICATIONS

This application is a continuation-in-part of U.S. Ser. No. 801,693, filed May 31, 1977 now abandoned.

BACKGROUND OF THE INVENTION

In the art of radioactive assay well logging, an assay tool is lowered into the borehole to a level of a formation to be assayed. The assay operation is then carried out by cyclically operating a neutron source so as to irradiate the formation with bursts of neutrons, the time between each burst being sufficient to allow the neutrons from the source to disappear and to allow delayed fission neutrons emitted by the formation to arrive at and be detected by a neutron detector. U.S. Pat. No. 3,686,503 to Givens, Caldwell, and Mills, Jr., describes such a system.

A pulsed neutron generator for such a system commonly takes the form of a three-element, linear accelerator tube. It includes a replenisher element which is electrically heated to boil off deuterium gas absorbed by the filament. The deuterium molecules are ionized by an ionizing section which commonly includes plates to which a positive ionization pulse is applied. The deuterium ions are then accelerated and bombard a target which includes tritium molecules. The bombardment of the deuterium ions on the tritium molecules yields helium pulse a supply of neutrons. One commercially available tube which is capable of such operation is the Kaman Nuclear Model A-801 Neutron Generator.

The output of an accelerator-type neutron source may vary during its operation. Hence, it is desirable to know what the neutron output is during each assaying period and, if desired, to correct or compensate for variations in the neutron output. The response time of a conventional fast neutron detector, however, it is not fast enough to detect directly and measure accurately the number of neutrons produced by the source when it is being operated to produce neutron bursts having a time duration of a few microseconds or less.

SUMMARY OF THE INVENTION

In accordance with the present invention, a method is provided for assaying for neutron-fission-producing ore in the formations traversed by a borehole. A pulsed neutron source and a neutron detector are located at various levels of formations of interest suspected of containing the ore. The source is operated to irradiate each of the formations with bursts of fast neutrons, the time between neutron bursts being long enough to allow delayed neutrons emitted as a result of neutron fission of the ore to appear at the detector. The detector responds to the delayed fission neutrons as a measure of the ore concentrations in the formations.

These assay operations are periodically stopped to monitor the output of the neutron source. The source and detector are located at the level of a nonneutron-fission-producing orebearing formation, and the source is operated to irradiate the formation with bursts of fast neutrons. The detector responds to the delayed neutrons emitted by oxygen-17 in the formations as a result of irradiation by the fast neutrons. These detected delayed neutrons are a measure of the output of the neutron source. Changes in the number of detected delayed neutrons over a given time period indicate a change in the output of the neutron source. Such changes are utilized in accordance with the present invention to correct the ore concentrations measured during the assay operations.

In one aspect, the delayed fission neutrons from the neutron-fission-producing ore are recorded during assay operations to obtain a log of the ore concentrations in the formations. The delayed neutrons from oxygen-17 are recorded during source-monitoring operations to obtain a log of the output of the neutron source, and this log is linearly interpolated over the time periods of the assay operations. The log of delayed fission neutrons from the ore is then corrected in accordance with the linearly interpolated log of the output of the neutron source.

In a further aspect, the output of the neutron source is controlled in response to changes in the amount of delayed neutrons emitted by oxygen-17 over a given time period.

BRIEF DESCRIPTION OF THE DRAWING

The FIGURE illustrates a borehole tool and recording system for carrying out the present invention.

DESCRIPTION OF THE BOREHOLE ASSAYING SYSTEM AND OPERATION

Referring to the FIGURE, the formation to be investigated or assayed is shown at 10. It is traversed by a borehole 11. Of interest are a determination of whether neutron-fission-producing ore, such as uranium or thorium, for example, is present in the formation and, if so, a quantitative measure of the ore grade. The formation is found initially from the relatively high count rate on a natural gamma-ray log previously obtained in the borehole.

Assaying is carried out by lowering a borehole tool 12 into the borehole to the level of the formation 10. The tool 12 contains a pulsed neutron source 13 and a thermal neutron detector 14. In one embodiment, the source 13 is an accelerator-type source which produces 14-Mev neutrons. It is operated cyclically to produce bursts of fast neutrons spaced in time to irradiate the formation 10. In the formation matrix, many of the fast neutrons from the source are moderated or slowed to thermal energies. Both thermal and fast neutrons react with the neutron-fission-producing ore, if present, for the production of delayed fission neutrons. These fission neutrons are slowed in the formation to thermal energies and are detected by the thermal neutron detector 14 which produces an output pulse for each neutron detected. The output of the detector 14 is transmitted to the surface to amplifier 15, pulse height discriminator 16, gated scaler 17, and recorder 18.

In one embodiment, the source 13 and the scaler 17 are operated to emphasize the shorter-lived, delayed fission groups. In this respect, the source 13 may be operated to produce very short neutron bursts at a repetition rate within the range of from 1 to 5 bursts per second. In one embodiment, the source may be operated at 2 bursts per second, each burst having a duration of about 3 microseconds. Cyclic irradiation may be carried out for a period of about 5 minutes. During this time, the detector 14 may be operated continuously to detect thermal neutrons. The scaler 17 is operated to count only thermal neutrons detected between neutron bursts and beginning at a time period after the moderated neutrons from the source have died away, i.e., have been absorbed by the formation. In this respect, scaler 17 may be operated to begin counting at 5 milliseconds after each neutron burst and to continue counting until the beginning of the next neutron burst. It then stops counting but begins counting again within the same corresponding time period during the next cycle. A log is obtained from recorder 18 of the numerical output of the scaler as a function of the number of ore atoms per unit volume of the formation which are directly relatable to ore grade. The recorder 18 is driven in correlation with depth of the tool 12 in the borehole by means of the reel 21 and connection 22.

DETAILED DESCRIPTION OF THE INVENTION

In accordance with the present invention there is provided a technique for periodically monitoring the output of the neutron source and, if desired, to correct or compensate for variations in the neutron output. Such technique involves the measurement of delayed neutrons from oxygen in a clean zone containing no neutron-fission-producing ores.

When oxygen-17 is irradiated with neutrons of energy greater than 7.93 Mev, the following reaction takes place:

$$O^{17}(n,p)N^{17}\underline{\beta^-}O^{17}\rightarrow O^{16}+n. \qquad (1)$$

The resulting neutrons produced have a maximum energy of about 2.2 Merv. Since the half life of the beta decay is of the order of 4.14 seconds, these neutrons are produced within the same time period that the shorter-lived fission groups from the ore zone are produced. Thus, they contribute to the count obtained by the scaler 17. It is found that there is little variation in the change of oxygen content from formation to formation within a given region. In this respect, it has been found that most formation matrices contain about 50 percent oxygen, with the change in oxygen content between formations being about 7 to 8 percent. A clear zone containing no neutron-fission-producing ores, and preferably close to the ore zone, is identified from a natural gamma-ray log. One such zone may be the formation illustrated at 20. In order to measure the delayed neutrons from oxygen in this zone, the tool 12 is raised to locate the source 13 and the detector 14 at the level of the formation 20. The source 13, the detector 14, and the scaler 17 then are operated in the same manner as that described with respect to the investigation of formation 10. Such source-monitoring operation is preferably carried out over a several-minute period, 5 to 20 minutes for example. A log is obtained from recorder 18 of the counts of the delayed neutrons from oxyten during this source-monitoring period as a measure of the neutron outut of the neutron source 13. The tool is then lowered or raised to the next ore zone for performing the next assay operation.

Measurements have shown that changes in the neutron output of the accelerator-type neutron source are linear, not sudden or sporadic. Changes in the order of 20 percent have been observed after one hour of source operation. Hence, it is desirable to stop the assay operation periodically, once per hour for example, and to monitor the neutron source output. The log obtained of the count of delayed neutrons from oxygen during the monitoring periods may be used to correct the log of the ore concentration in the formation from the delayed fission neutrons measured during the assey operations for changes in the output of the neutron source. A linear interpolation of the log of the count of delayed neutrons from oxygen will yield a continuous correction for the ore concentration log.

In the alternative, it may be desirable to adjust the neutron output of the neutron source following each monitoring period. In operation an accelerator-type neutron source, it is important that the power supplied to the replenisher element be correctly adjusted so that the proper amount of deuterium gas boils off the replenisher element to provide a good neutron output. As the accelerator tube ages, a greater amount of power must be supplied to the replenisher element to boil off the same amount of deuterium gas. Accordingly, the power supplied to the replenisher element in the linear accelerator tube may be varied from the uphole power source 19 following each monitoring period should it be desirable to maintain a uniform neutron output over each of a plurality of assay operations.

I claim:
1. A method of assaying for neutron-fission-producing ore in the formations traversed by a borehole, comprising the steps of:
 (a) locating a pulsed neutron source and a neutron detector at various levels of formations of interest suspected of containing a neutron-fission-producing ore,
 (b) assaying each of said formations of interest by cyclically operating said source to irradiate each of said formations of interest with bursts of fast neutrons,
 (c) detecting radiation from said neutron-fission-producing ore in each of said formations of interest,
 (d) periodically stopping said assaying operations to monitor the output of said neutron source by the steps of:
  (i) locating said source and detector at the level of a formation having no neutron-fission-producing ore,
  (ii) operating said source to irradiate said monorebearing information with bursts of fast neutrons, and
  (iii) detecting delayed neutrons emitted by oxygen-17 in said nonore-bearing formation as a result of irradiation by neutrons, said delayed neutrons being indicative of the output of said source,
 (e) recording the radiation from said neutron-fission-producing ores during assay operations at said various levels of formations of interest to obtain a log representative of the ore concentrations in said formations of interest,
 (f) recording said delayed neutrons from oxygen-17 between assay operations to obtain a log of the neutron output of said source,
 (g) linearly interpolating the log of the neutron output of said source over the time periods of said assay operations, and
 (h) correcting the log of radiation from said neutron-fission-producing ores obtained during assay operations in accordance with the linearly interpolated log of the output of said neutron source.
2. The method of claim 1 further comprising the step of controlling the output of the neutron source by:
 (a) increasing the power supplied to the neutron source to increase its neutron output in response to a decrease in the number of detected delayed neutrons from oxygen-17, and
 (b) decreasing the power supplied to the neutron source to decrease its neutron output in response to an increase in the number of detected delayed neutrons from oxygen-17.
3. The method of claim 1 wherein said neutron-fission-producing ore is uranium.
4. The method of claim 1 wherein said neutron-fission-producing ore is thorium.

UNITED STATES PATENT AND TRADEMARK OFFICE
CERTIFICATE OF CORRECTION

PATENT NO. : 4185193
DATED : January 22, 1980
INVENTOR(S) : Richard L. Caldwell

It is certified that error appears in the above-identified patent and that said Letters Patent are hereby corrected as shown below:

Column 1, line 32, "pulse" should read --plus--;
 line 40, after "however," "it" should be deleted.

Column 3, line 28, the "β" should be --"β"--;
 line 31, "Merv." should read --Mev.--;
 line 41, "clear" should read --clean--;
 line 53, "oxyten" should read --oxygen--;
 line 55, "outut" should read --output--;
 line 68, "assey" should read --assay--.

Column 4, line 35, "monore-" should read --nonore- --.

Signed and Sealed this

Fifteenth Day of April 1980

[SEAL]

Attest:

Attesting Officer

SIDNEY A. DIAMOND

Commissioner of Patents and Trademarks